H. G. TIFFANY.
STAND.
APPLICATION FILED FEB. 23, 1921.

1,426,328.

Patented Aug. 15, 1922.
2 SHEETS—SHEET 1.

INVENTOR
Hiero Gillas Tiffany.
By
Bakewell Church
ATTORNEYS

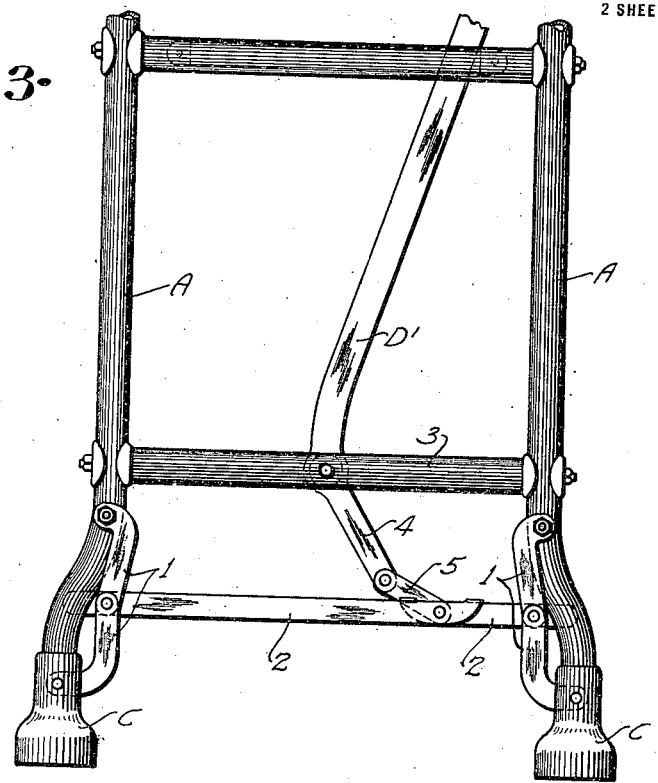
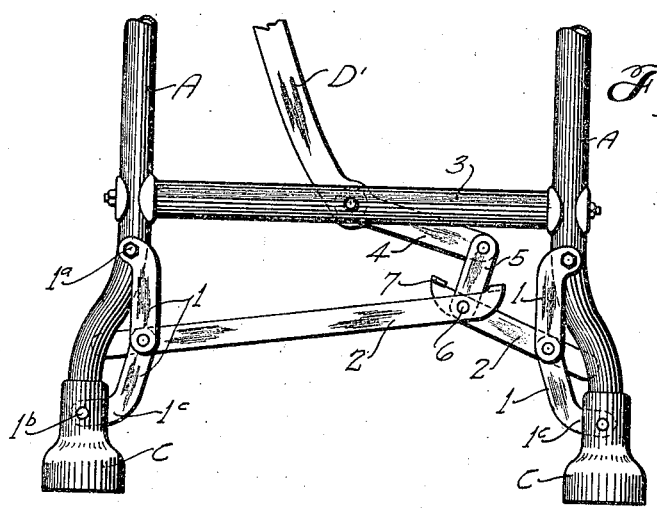

UNITED STATES PATENT OFFICE.

HIERO G. TIFFANY, OF ST. LOUIS, MISSOURI, ASSIGNOR TO SIMPLEX STEEL STAMPING & MANUFACTURING COMPANY, OF ST. LOUIS, MISSOURI, A CORPORATION OF MISSOURI.

STAND.

1,426,328.      Specification of Letters Patent.     Patented Aug. 15, 1922.

Application filed February 23, 1921. Serial No. 446,997.

*To all whom it may concern:*

Be it known that I, HIERO G. TIFFANY, a citizen of the United States, residing at St. Louis, Missouri, have invented a certain new and useful Improvement in Stands, of which the following is a full, clear, and exact description, such as will enable others skilled in the art to which it appertains to make and use the same.

This invention relates to stands of the kind that are equipped with rollers or casters which are adapted to be depressed into engagement with the floor so as to facilitate the movement of the stand from one point to another and thereafter raised out of contact with the floor when it is desired to have the stand remain stationary.

The main object of my invention is to provide an inexpensive stand of the general type above referred to that can be raised and lowered easily and which is of such design that the legs will be perfectly rigid when the rollers are raised out of contact with the floor.

Another object is to provide an efficient raising and lowering mechanism for stands of the character referred to which comprises a number of sets of toggle links connected to the legs of the stand and to vertically-movable sleeves that surround the lower end portions of the legs, and an operating mechanism for said toggle links consisting of a rock shaft arranged intermediate the legs and connected with operating bars whose end portions are guided by the legs of the stand. Other objects and desirable features of my invention will be hereinafter pointed out.

Figure 1 of the drawings is a perspective view of a stand constructed in accordance with my invention.

Figure 3 is a side elevational view, showing the sleeves on the legs depressed so as to hold the rollers on the legs out of contact with the floor; and Figure 4 is a side elevational view of the stand, showing the sleeves on the legs raised so as to cause the legs of the stand to be supported by the rollers or casters mounted in the lower ends of the legs.

Figure 2:
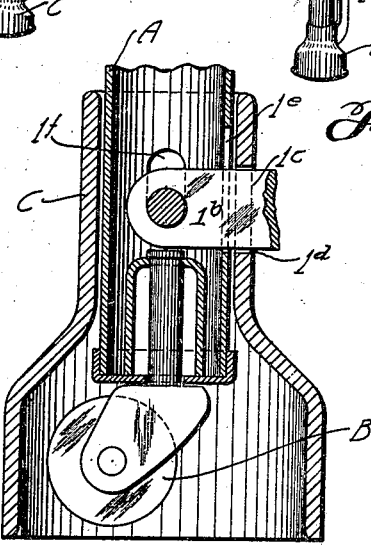
Figure 2 is a longitudinal sectional view of the lower end portion of one of the legs and the sleeve that surrounds same.

Referring to the drawings which illustrate the preferred form of my invention, A designates the legs of the stand which are preferably formed from pieces of metal tubing, B designates casters or rollers rigidly mounted in the lower end portions of the legs, as shown in Figure 2, and C designates tubular-shaped supporting members or sleeves arranged in telescopic relation with the lower end portions of the legs and so designed that they surround or encase the rollers B in the legs. When it is desired to have the stand remain in a stationary position the sleeves or tubular supporting members C are depressed or moved downwardly with relation to the legs so as to lift the rollers B out of contact with the floor and cause the weight of the stand to be borne by the sleeves C. When it is desired to move the stand from one point to another the sleeves C are raised or moved upwardly with relation to the legs so as to permit the rollers B on the legs to contact with the floor.

Figure 1:
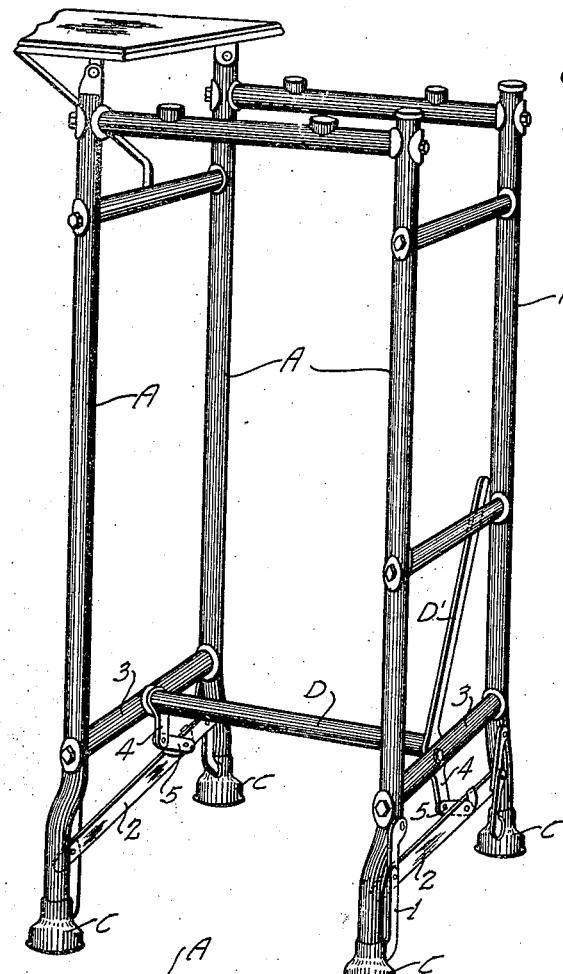

The means for raising and lowering the sleeves C consists of four sets of toggle links 1 connected with the legs A and with the sleeves C and an operating mechanism for said toggle links consisting of a rock shaft D arranged transversely of the stand at approximately the center of same, as shown in Figure 1, and combined with operating bars 2 that are joined to the toggle links 1, the movement of the rock shaft D in one direction causing the toggle links to be straightened, as shown in Figure 3, thus resulting in an upward movement of the stand, and the movement of said rock shaft in the opposite direction causing the toggles to "break" or collapse, and thus permit the stand to move downwardly so as to bring the rollers B on the legs into engagement with the floor.

A pair of toggle links 1 is provided for each of the sleeves C, one link of the pair being pivotally connected at its upper end by means of a pivot 1ª to the leg of the stand, and the other link of the pair being pivotally connected at its lower end by means of a pivot 1ᵇ to the sleeves C with which said pair of toggle links co-operate. The lower link of the pair is provided with an angularly-disposed portion 1ᶜ that projects into the sleeve C through a vertically-disposed slot 1ᵈ in the upper portion of the sleeve, so as to permit the pivot 1ᵇ of said link to be arranged at the vertical longitudinal axis of the sleeve C. The leg A of the stand which the sleeve C surrounds is provided with a vertically-disposed slot $1^e$ through which the angularly-disposed portion of the lower link passes and also oppositely-disposed, vertical slots $1^f$ through which the pivot pin $1^b$ of the sleeve passes, so as to provide for the relative longitudinal movement of the sleeve C and the leg A which it surrounds. This method of connecting the toggle links to the sleeves C produces an exceptionally strong and rugged construction and eliminates any tendency of the sleeves to cant, twist or turn relatively to the legs, due to the fact that the lower links of the toggles are connected to the sleeves C at the vertical longitudinal axes of said sleeves, and moreover, are guided by slots in the sleeves and slots in the legs of the stand.

The rock shaft D of the toggle operating mechanism is arranged horizontally and is supported by horizontally-disposed braces 3 connected to the legs A of the stand. In the form of my invention herein illustrated said shaft is provided with an operating lever D' arranged at one side of the stand so that it can be actuated easily by the person who desires to move the stand. It will, however, be understood that various other forms of devices can be used for actuating the rock shaft D without departing from the spirit of my invention. The rock shaft D is provided with two arms 4 arranged adjacent the ends of said shaft, as shown in Figure 1, and connected by means of links 5 with the operating bars 2 previously referred to that actuate the toggle links 1. The stand is equipped with four operating bars, two of which are connected with the arm 4 on one end of the rock shaft D, and the remaining operating bars being connected with the arm 4 on the other end of the rock shaft. Each pair of operating bars 2 have their inner end portions lapped and pivotally connected together by a pivot pin 6 that serves also to connect the operating bars to the link 5 which joins said bars to one of the arms on the rock shaft D, and said bars are provided at their inner ends with laterally-projecting lugs 7 arranged so that the lug on one bar 2 will bear upon the upper edge of the other operating bar with which it co-operates when the rock shaft D is turned in a direction to straighten the toggle links 1, as shown in Figure 3, said lugs 7 serving as stops which hold the operating bars 2 of each pair in parallel relation or in longitudinal alignment with each other when the stand is supported by the sleeves C. Each of the operating bars 2 is pivotally connected adjacent its outer end to one pair of toggle links 1, and the extreme end portion of said operating bar is arranged in a vertically-disposed slot in the particular leg of the stand with which said bar co-operates, as shown in Figures 3 and 4. Accordingly, the operating bars 2 will be rigidly held and accurately guided, due to the fact that the inner end portions of said bars are overlapped, and directly connected to the means that actuates said bars, and the outer end portions of said bars are guided by the legs A of the stand.

A stand of the kind above described can be manufactured at a low cost on account of its simplicity of construction, it can be easily moved from place to place on the rollers B when the supporting sleeves C are raised, and when said supporting sleeves are depressed or moved downwardly into engagement with the floor, the legs of the stand will be perfectly rigid, due to the fact that the weight of the stand is borne by the sleeves C and the toggle links 1 which are connected to the sleeves in such a manner that the sleeves cannot twist or cant laterally relatively to the legs of the stand. The operating bars 2 and the toggle links 1 are so constructed and arranged that the sleeves C on the legs will be locked securely in their extended position when the toggle links are straightened, as shown in Figure 3, and as the outer end portions of the operating bars 2 are guided by the legs of the stand, said bars prevent the toggle links from swaying or from moving laterally at the points where the links of each pair of toggles are connected together. In addition to the desirable features above pointed out, my stand is of neat and ornamental appearance and it can be raised and lowered easily by simply depressing or raising the actuating member D' on the rock shaft D.

Having thus described my invention, what I claim as new and desire to secure by Letters Patent is:

1. A stand provided with legs, supporting members arranged in telescopic relation with said legs, a pair of toggle links associated with each leg and supporting member and pivotally connected with same in such a manner that said links exert a downward thrust on said supporting members when the links are straightened, and an operating mechanism for said toggle links comprising an operating bar connected to each pair of toggle links and having its outer end projecting into an opening in the adjacent leg of the stand, whereby said bar is accurately guided.

2. A stand comprising legs equipped with casters or rollers, substantially tubular-shaped supporting members arranged in telescopic relation with the lower end portions of the legs, and toggle links pivotally connected to said legs and to said supporting members for raising and lowering the stand, each of the toggles comprising a link having an angularly-disposed portion projecting through aligned, vertically-disposed slots in the supporting member and in the leg which said member surrounds and connected to a pivot pin on the supporting member that passes transversely through vertically-disposed slots in the leg of the stand.

3. In a stand, a leg, a longitudinally-movable sleeve surrounding the lower end portion of the leg, a toggle for reciprocating said sleeve comprising an upper link pivotally connected at its upper end to the leg of the stand and a lower link pivotally connected at its lower end to said sleeve, an angularly-disposed portion on said lower link, vertically aligned slots in the sleeve and in the portion of the leg which it surrounds through which the angularly-disposed portion of said link passes, the pivot pin for said lower link being arranged transversely of said sleeve at the longitudinal axis of said sleeve, and vertically-disposed slots in the leg of the stand through which said pivot pin passes.

4. A stand provided with legs equipped with casters or rollers, vertically-movable sleeves surrounding the lower end portions of said legs, and operating toggles for said sleeves pivotally connected at their upper ends to the legs of the stand and having their lower ends pivotally connected to said sleeves by angularly-disposed portions that project into the interior of the sleeves through aligned slots in the sleeves and in the portions of the legs which the sleeves surround.

5. A stand comprising legs, supporting members arranged in telescopic relation with the legs, toggles pivotally connected to the legs and to the supporting members for effecting relative longitudinal movement of said supporting members and legs, and an actuating means comprising pairs of bars having their inner end portions pivotally connected together and arranged in overlapped relation and their outer end portions pivotally connected to said toggles and guided by the legs of the stand.

6. A stand comprising legs provided with casters or rollers, vertically reciprocating sleeves surrounding the lower end portions of said legs, a toggle associated with each leg and composed of an upper link pivotally connected to the leg and a lower link provided with an angularly-disposed portion that projects inwardly through the sleeve and the portion of the leg which it surrounds, a transversely-disposed pivot pin in the sleeve to which said angularly-disposed portion is connected, a horizontally-disposed rock shaft supported by the legs of the stand, arms on said rock shaft, operating bars arranged in pairs and connected by means of links to said arms, pivotal connections between said operating bars and said toggle links, vertical slots in the legs of the stand into which the outer end portions of said operating bars project, and means for maintaining the operating bars of each pair in substantially longitudinal alignment with each other when the rock shaft is turned in a direction to raise the stand.

HIERO G. TIFFANY.